Feb. 17, 1959 F. H. GREEN 2,873,582
AIR CONDITIONING SYSTEM FOR SPACE SHIPS
Filed Jan. 25, 1957
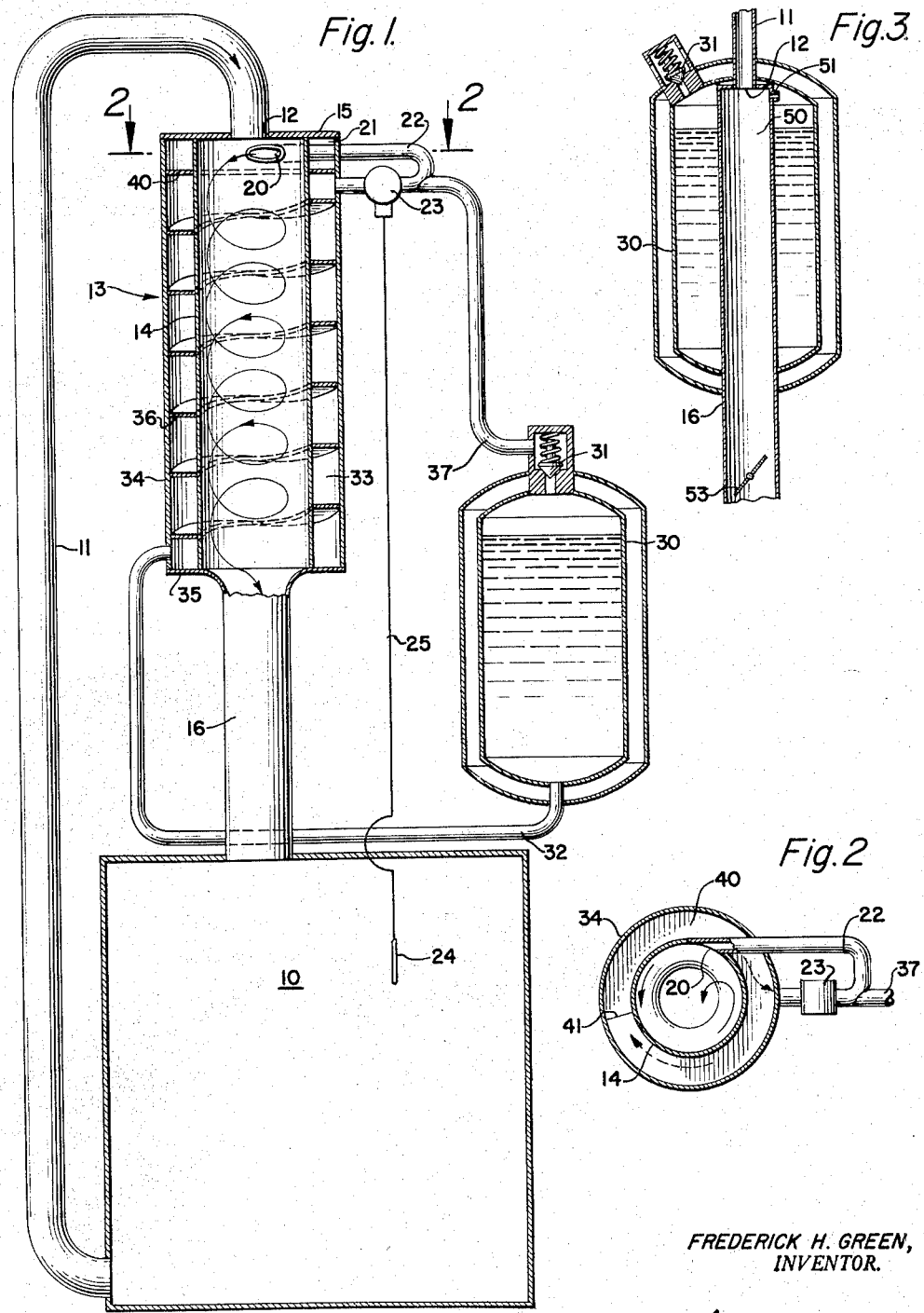
FREDERICK H. GREEN,
INVENTOR.
BY

United States Patent Office 2,873,582
Patented Feb. 17, 1959

2,873,582

AIR CONDITIONING SYSTEM FOR SPACE SHIPS

Frederick H. Green, Palos Verdes Estates, Calif., assignor to The Garrett Corporation, Los Angeles, Calif., a corporation of California Application January 25, 1957, Serial No. 636,358

12 Claims. (Cl. 62—5)

This invention pertains to an air conditioning system and more particularly to an air conditioning system using liquid oxygen as a refrigerant.

In the air conditioning of space ships and aircraft designed to fly at extreme altitudes, the problem arises of supplying oxygen to the atmosphere in the cabin of the airplane or space ship. In addition to supplying oxygen to the cabin it is necessary to remove heat from the atmosphere in the cabin and to circulate the atmosphere within the cabin. The circulation of the atmosphere is especially important under conditions of low or substantially zero gravity, because natural convection will not circulate the atmosphere in the cabin. Thus, in the absence of any circulation, some sections of the cabin could become so highly contaminated due to stagnation that they would not sustain life even though the over-all contamination was within acceptable limits.

The most practical method at present for carrying a supply of oxygen on a high-altitude aircraft or space ship is to carry it in the liquid form. When oxygen is carried in liquid form some device is required to boil the liquid oxygen and convert it to a gaseous state so that it can be admitted to the cabin. In addition to a device for converting the oxygen to a gas, some other mechanism will be required to thoroughly mix the oxygen with the atmosphere in the cabin and re-introduce the combined mixture into the cabin.

This invention solves the above problems by using a device incorporating a vortex tube to withdraw the air from the cabin and mix it with the incoming supply of gaseous oxygen and re-introduce it into the cabin. The vortex tube, in addition to circulating the air in the cabin and mixing it with the incoming oxygen supply, will also cool the atmosphere. The heat generated by the vortex tube in cooling the atmosphere in the cabin is used to boil the liquid oxygen and convert it to a gas.

Accordingly, the principal object of this invention is to provide a novel air conditioning system for an enclosure, which has no moving parts and utilizes a supply of liquid oxygen as a refrigerant.

Another object of this invention is to provide an air conditioning system for an enclosure, utilizing a supply of liquid oxygen as a refrigerant and having a unique mechanism for both cooling the atmosphere and mixing with it the oxygen to be added.

Another object of this invention is to provide a novel air conditioning system for an enclosure, utilizing the heat which must be removed from the enclosure to boil the liquid oxygen which is used as a refrigerant.

These and other objects and advantages of this invention will be more easily understood by those skilled in the art from the following detailed description of a preferred embodiment when taken in conjunction with the attached drawing, in which:

Fig. 1 is a schematic arrangement of an air conditioning system utilizing a supply of liquid oxygen as the refrigerant;

Fig. 2 is a horizontal section taken along line 2—2 of Fig. 1;

Fig. 3 is a schematic arrangement of a second embodiment of this invention showing the vortex tube mounted inside of the liquid oxygen storage vessel.

As shown in Fig. 1, the enclosure 10 represents the cabin of an extreme altitude aircraft or space ship, the atmosphere of which must be cooled. In addition, the atmosphere in the enclosure 10 must be circulated, especially under conditions of substantially zero gravity, in order to prevent any portion of the atmosphere from becoming too highly contaminated. Also, in order to sustain life in the enclosure 10, oxygen must be added to the enclosure at the same rate at which it is consumed by the persons occupying the enclosure. The atmosphere at extreme altitudes is so rare that no feasible amount of compressing will supply sufficient oxygen to sustain life, and thus oxygen from a suitable supply must be added to the atmosphere in the enclosure.

The enclosure 10 is exhausted through a suitable conduit 11 which connects the enclosure with the upper end of a vortex tube, indicated generally at 13. The lower end of the vortex tube is connected to the enclosure by means of a conduit 16. The vortex tube will thus withdraw the atmosphere from the enclosure 10, mix it with the oxygen being added to the system and re-introduce it into the enclosure. The vortex tube consists of a tubular member 14 which is preferably formed of seamless tubing which is provided with a smooth finish on its inner surface. The top end of the tubular member 14 as shown in the attached figure is closed by means of a flat plate 15 which is secured to tubular member 14 by any desired means, such as welding, or the like. The plate 15 is provided with an opening 12 at its center, to which the conduit 11 is connected. Projecting through the wall of the tubular member 14 adjacent the top plate 15 is an inlet orifice or nozzle 20. The inlet orifice 20 is mounted so that it will introduce the supply of oxygen gas used for operating the vortex tube approximately tangentially with respect to the inner surface of the tubular member 14. The inlet orifice 20 passes through an annular-shaped chamber 21 which surrounds the outside of the tubular member 14. The inlet orifice 20 is connected to a source of pressurized oxygen by means of a conduit 22. Mounted in the conduit 22 is a flow control valve 23 which may be actuated by a sensing element 24 positioned in the interior of the enclosure 10. The sensing element 24 which is connected to the flow control valve 23 by a communicating lead 25 may be of any well-known type which will sense the oxygen level, the temperature level, or the pressure level, or any combination of these levels and control the flow of pressurized fluid to the inlet orifice 20 so as to maintain the desired conditions in the enclosure 10.

The supply of liquid oxygen may be carried in any suitable pressure vessel 30 which is shown in Fig. 1 as having a double wall. Even when a double wall pressure vessel is used, sufficient heat will be transmitted through the walls of the pressure vessel to convert a portion of the liquid oxygen supply to a gas. Thus, some means such as the relief valve 31 must be provided for limiting the pressure in the pressure vessel 30. The discharge of the relief valve 31, which is mounted on the top part of the vessel 30, is connected to the conduit 22 by a conduit 37. The bottom of the vessel 30 is connected to the inlet of a heat exchanger 33 which surrounds the outside of the vortex tube, by means of a conduit 32. The heat exchanger 33 includes a tubular member 34 which surrounds the outside of the vortex tube and is radially spaced therefrom. The annular space between the tubular member 14 and the tubular member 34 is closed at the lower end by means of a ring-shaped plate 35 which is attached to both of the tubular members by any desired means, such as welding, or the like. The top of the annular space is closed by means of the plate 15 which closes the top of the vortex tube, thus forming the top wall of the chamber 21. The liquid oxygen which is admitted to the annular space between the tubular member 14 and the tubular member 34 is caused to flow in a helical path around the outside of the vortex tube by means of a helical-shaped baffle 36 which is mounted in the annular space between the two tubular members. In some cases it may be desirable to omit the helical baffle 36 and allow the liquid oxygen to flow axially through the annular area. The upper end 40 of the helical-shaped baffle 36 is joined to the last turn of the baffle at 41 so as to form the bottom wall of the annular-shaped chamber 21 previously described. In cases where additional strength is required the last turn of the baffle 36 may be replaced by a ring-shaped member which is joined to the tubular members 14 and 34.

When the flow control means 23 is open a small amount of gaseous oxygen will be admitted from the heat exchanger 33 through conduit 22 to the inlet orifice 20. A small amount of oxygen will always remain in the gaseous state, even though no heat is specifically added to the oxygen supply, inasmuch as some heat will be absorbed from the surrounding atmosphere. In order to insure that the portion of the oxygen which is in the gaseous state is contained in the top of the heat exchanger 33 adjacent the plenum chamber 21, the vortex tube should be mounted with its longitudinal axis parallel to the normal direction of gravity and with the inlet farthest removed from the center of gravity of the system. The pressure vessel 30 should be similarly oriented so that only gaseous oxygen will occupy the portion of the pressure vessel adjacent the relief valve 31. If it is desired to maintain the proper orientation of the system under essentially zero gravitational conditions, it can be mounted in suitable gimbals or upon well-known stabilizing devices which create a local artificial gravity. After the gaseous oxygen is admitted to the inlet orifice 20 it will flow into the vortex tube. As the gaseous oxygen flows from the inlet orifice 20 it will form a helical flow pattern in the outer portion of the inner tubular member 14. This helical flow of the gaseous oxygen will create a low pressure at the inlet 12 of the vortex tube which will withdraw a portion of the atmosphere from the enclosure 10 through the conduit 11. It is of course well known that if the outlet of a vortex tube has a very low pressure drop all the fluid will flow out the outlet and in addition a low pressure will be created at the inlet end, causing an inflow of fluid at this point. The gaseous oxygen due to its higher pressure will be moving at a higher velocity than the atmosphere withdrawn from the enclosure 10. Thus, the heat contained in the atmosphere removed from the enclosure 10 will be rapidly transmitted to the oxygen flowing in the outer portion of the vortex tube. The heat which is absorbed by the oxygen will then be transmitted to the inner surface of the tubular member 14. Here again, good heat transfer will take place due to the relatively fast movement of the oxygen and air over the inner surface of the tubular member 14.

The heat which is transmitted from the gaseous oxygen to the tubular member 14 will flow through the wall of the tubular member 14 and be transferred to the liquid oxygen which is flowing in the heat exchanger 33 which surrounds the vortex tube. In addition to the heat removed from the atmosphere of the enclosure 10, an additional favorable temperature gradient will exist due to the well known vortex tube action. This well known action results in an increase in the temperature of the outer portion of the gas and a cooling of the inner portion, thus permitting the vortex tube to boil the liquid oxygen and cool the atmosphere in the enclosure 10. After flowing from the outlet of the vortex tube, the mixture of oxygen and atmosphere withdrawn from the enclosure 10 will be admitted to the enclosure 10. Of course the enclosure 10 should be provided with some well known type of pressure regulating means in order to prevent an excessive increase in the pressure existing in enclosure 10.

Referring to Fig. 3, there is shown a modification of this invention in which the vortex tube is mounted inside the pressure vessel 30. This permits the elimination of the heat exchanger 33 which surrounds the vortex tube 14 in the embodiment illustrated in Fig. 1. The vortex tube 50 of Fig. 3 is mounted so that its inlet nozzle 51 is adjacent one end of the pressure vessel. The pressure vessel should be mounted so that this end is away from the normal center of gravity, and under conditions of zero gravity the pressure vessel should be mounted in gimbals or stabilized to insure that it is properly oriented. The opening 12 in the upper end of the vortex tube 50 is connected to the space 10 to be cooled by the conduit 11, while the lower end is connected to the space 10 by means of the conduit 16. A flow control valve 53 is mounted in the duct 16 to control flow through the vortex tube. The valve 53 is controlled by a sensing element similar to the element 24 shown in Fig. 1. While the valve 53 is shown as being mounted at the lower end of the vortex tube, it, of course, could be mounted at the upper end of the vortex tube.

When the air conditioning system shown in Fig. 3 is operated, the outer wall of the vortex tube 50 will act as the heat exchanger and transfer heat from the atmosphere removed from the space 10 directly to the liquid oxygen contained in the pressure vessel 30. The heat transferred to the liquid oxygen will convert a portion of it to a gas which, in turn, will be used to operate the vortex tube. The valve 53 will control the amount of discharge from the vortex tube. Thus, the amount of oxygen flowing into the vortex tube will also be controlled which, in turn, will control the amount of atmosphere withdrawn from the space 10.

From the above description of two embodiments of this invention, it can easily be seen that a simple device which has no moving parts, except for the relief valve 31 and the control valves, has been provided. This device will both cool the atmosphere in the enclosure 10 and add oxygen to it while utilizing a supply of liquid oxygen as both the refrigerant and source of oxygen. In addition, since all of the operations have been combined in one simple device, it will be relatively small and light in weight which is important in any application of an air conditioning system to an aircraft or space ship.

While only two embodiments have been shown and described in detail, many modifications and changes will occur to those skilled in the art without departing from the broad scope and spirit of this invention.

What I claim is:

1. An air conditioning system for an enclosed space comprising: a source of liquid oxygen; a vortex tube having an inlet orifice, and suction and discharge openings; circulating means for conducting said liquid oxygen from said source over the outer surface of said vortex tube while maintaining said liquid oxygen in heat exchange relationship with said surface; conduit means connected to said circulating means and said inlet orifice and means for connecting said suction and discharge openings to said enclosure.

2. A system for adding oxygen to an enclosed space from a source of liquid oxygen comprising: a vortex tube having an inlet orifice; circulating means for conducting said liquid oxygen from said source over the outer surface of said vortex tube; conduit means connected to the outlet of said circulating means and the inlet orifice of said vortex tube; the discharge of said vortex tube being connected to said enclosed space.

3. An air conditioning system for an enclosed space comprising: a vortex tube having an inlet orifice, and suction and discharge openings; a heat exchanger surrounding the exterior surface of said vortex tube and in contact therewith, said heat exchanger having an inlet at one end and an outlet at the other end of said vortex tube; a source of liquid oxygen; conduit means for connecting said source to the inlet of said heat exchanger; additional conduit means for connecting the outlet of said heat exchanger to said inlet orifice; flow control means mounted in said additional conduit means for controlling the flow therethrough; the suction and discharge openings of said vortex tube being connected to said enclosure.

4. An air conditioning system for an enclosure comprising: a supply of liquid oxygen; heat exchange means for conducting said liquid oxygen into a heat exchange relationship with air withdrawn from said enclosure to cool the air and vaporize the oxyen; a vortex tube arranged to employ the energy of the vaporized oxygen to withdraw air from said enclosure and circulating it over said heat exchange means; conduit means for conducting said oxygen from said heat exchange means to said vortex tube; and means for mixing the air withdrawn from said enclosure with the oxygen and returning it to said enclosure.

5. An air conditioning system for an enclosure comprising: a supply of liquid oxygen; heat exchange means for conducting said liquid oxygen into a heat exchange relationship with air withdrawn from said enclosure to cool the air and vaporize the oxygen; a vortex tube arranged to employ the energy of the vaporized oxygen to withdraw air from said enclosure and circulating it over said heat exchange means; conduit means for conducting said oxygen from said heat exchange means to said vortex tube; flow control means mounted in said conduit means for controlling the flow therein, and means for mixing the air withdrawn from said enclosure with the oxygen and returning it to said enclosure.

6. An air conditioning device for an enclosure comprising: a vortex tube having an opening at each end and an inlet orifice; a tubular member surrounding said vortex tube and spaced therefrom; a helical-shaped baffle mounted in the annular space between said vortex tube and said tubular member, said annular space in addition being closed at each end; an inlet opening formed in said annular space adjacent one end of said vortex tube and an outlet opening formed in said annular space adjacent the other end of said vortex tube; a supply of liquid oxygen; conduit means for connecting said source of liquid oxygen to the inlet of said annular space; additional conduit means for connecting the outlet of said annular space to the inlet orifice of said vortex tube and means for connecting end openings of said vortex tube to said enclosure.

7. An air conditioning device comprising: a vortex tube having an outlet at one end and an inlet at the opposite end; an inlet orifice adjacent the inlet of said vortex tube; a supply of liquid oxygen; a heat exchanger surrounding outer surface of said vortex tube and in contact with said surface; said heat exchanger having an inlet opening adjacent the outlet of said vortex tube and an outlet opening adjacent the inlet of said vortex tube; conduit means for connecting said supply of liquid oxygen to the inlet of said heat exchanger; additional conduit means for connecting the outlet of the heat exchanger to the inlet orifice of said vortex tube and means for connecting the inlet and outlet of said vortex tube to a space to be cooled.

8. An air conditioning device comprising: a container holding a supply of liquid oxygen; a vortex tube having an inlet orifice and inlet and outlet openings; a portion of said vortex tube projecting into the interior of said container; means for connecting said inlet orifice to the interior of said container, and means for connecting the inlet and outlet openings of said vortex tube to a space to be cooled.

9. An air conditioning device comprising: a container holding a supply of liquid oxygen; a vortex tube disposed within said container; said vortex tube having an inlet orifice and inlet and outlet openings; said inlet orifice communicating with the interior of said container; conduit means for connecting said inlet and outlet openings to a space to be cooled, and flow control means disposed so as to control flow through said conduit means.

10. An air conditioning device comprising: a supply of gas including a quantity in liquid form; a vortex tube having its outer surface disposed in heat exchange relation with at least a portion of said liquid gas, said vortex tube having an inlet at one end and an outlet at the opposite end; and an inlet orifice in said vortex tube adjacent the inlet end thereof, said inlet orifice being arranged to communicate with said gas.

11. An air conditioning device comprising: a supply of liquid oxygen; a vortex tube having its outer surface disposed in heat exchange relation with at least a portion of said liquid oxygen to vaporize said oxygen, said vortex tube having inlet means at one end for receiving fluid to be cooled and outlet means at the opposite end for delivering said fluid to a point of use; and an inlet orifice in said vortex tube adjacent the inlet end thereof, said inlet orifice being arranged to admit vaporized oxygen to the interior of said tube.

12. An air conditioning device for cooling and oxygenating the air in an enclosure comprising: a supply of liquid oxygen; a vortex tube having its outer surface disposed in heat exchange relation with at least a portion of said liquid oxygen to vaporize said oxygen, said vortex tube having inlet means at one end for receiving air from said enclosure and outlet means at the opposite end for returning said air to said enclosure; and a tangential inlet orifice in said vortex adjacent the inlet end thereof, said inlet orifice being arranged to admit vaporized oxygen to cause said mixture of air and oxygen to pass through the vortex tube with a swirling motion.

References Cited in the file of this patent

UNITED STATES PATENTS

| 1,544,854 | Mueller | July 7, 1925 |
| 2,650,582 | Green | Sept. 1, 1953 |
| 2,786,341 | Green | Mar. 26, 1957 |